US008474806B2

(12) United States Patent
Orgeron

(10) Patent No.: US 8,474,806 B2
(45) Date of Patent: Jul. 2, 2013

(54) PIPE GRIPPING APPARATUS

(75) Inventor: Keith J. Orgeron, Houston, TX (US)

(73) Assignee: T&T Engineering Services, Inc., Tomball, TX (US)

( * ) Notice: Subject to any disclaimer, the term of this patent is extended or adjusted under 35 U.S.C. 154(b) by 871 days.

(21) Appl. No.: 12/359,926

(22) Filed: Jan. 26, 2009

(65) Prior Publication Data

US 2010/0187740 A1 Jul. 29, 2010

(51) Int. Cl.

| | |
|---|---|
| ***B25B 1/06*** | (2006.01) |
| ***B25B 1/14*** | (2006.01) |
| ***B25B 1/20*** | (2006.01) |
| ***B25B 27/14*** | (2006.01) |
| ***B23Q 3/08*** | (2006.01) |
| ***B23P 19/04*** | (2006.01) |

(52) U.S. Cl.
USPC ............... 269/218; 269/32; 269/228; 269/24; 269/43; 269/45; 29/252; 29/261; 29/278; 29/218

(58) Field of Classification Search
USPC .................... 269/32, 228, 24, 43, 45; 29/252, 29/261, 278, 218
See application file for complete search history.

(56) References Cited

U.S. PATENT DOCUMENTS

| | | | |
|---|---|---|---|
| 1,396,317 | A | 11/1921 | Boyter |
| 1,417,490 | A | 5/1922 | Brandon |
| 1,972,635 | A | 9/1934 | Whinnen |
| 1,981,304 | A | 11/1934 | Brandt |
| 2,124,154 | A | 7/1937 | Sovincz |
| 2,147,002 | A | 2/1939 | Volpin |
| 2,509,853 | A | 5/1950 | Wilson |
| 2,535,054 | A | 12/1950 | Ernst et al. |
| 2,814,396 | A | 11/1957 | Neal, Sr. |

(Continued)

FOREIGN PATENT DOCUMENTS

| | | | |
|---|---|---|---|
| JP | 2001-287127 | A | 10/2001 |
| WO | 93/15303 | A1 | 8/1993 |
| WO | 2010/085803 | A2 | 7/2010 |

OTHER PUBLICATIONS

U.S. Appl. No. 11/923,451, filed Oct. 24, 2007; non-published; titled "Pipe Handling Apparatus and Method" and having common inventors with the present patent application.

(Continued)

*Primary Examiner* — Monica Carter
*Assistant Examiner* — Nirvana Deonauth
(74) *Attorney, Agent, or Firm* — John G. Fischer, Esq.; Paul D. Lin, Esq.; Scheef & Stone, L.L.P.

(57) ABSTRACT

A pipe gripping apparatus has a first jaw with a pipe-contacting surface at one end thereof, a second jaw having a pipe-contacting surface at one end thereof, a tongue having a pipe-contacting surface at one end thereof, and an actuator connected to the first and second jaws and to the tongue. The actuator serves to move the first and second jaws and the tongue such that the pipe-contacting surfaces thereof move radially inwardly simultaneously for a substantially identical distance. A first link pivotally connects the tongue with the first jaw. A second link pivotally connects the tongue with the second jaw. The first and second links extend angularly outwardly from the tongue. The first and second pivot points of each jaw have a distance unequal to a distance between the first pivot point and pipe-contacting surface of each jaw. The pipe-contacting surfaces can be elastomeric pads, toothed dies, or rollers.

7 Claims, 6 Drawing Sheets

U.S. PATENT DOCUMENTS 3,016,992 A 1/1962 Wilson
3,059,905 A 10/1962 Tompkins
3,177,944 A 4/1965 Knights
3,194,313 A 7/1965 Fanshawe
3,280,920 A 10/1966 Scott
3,290,006 A 12/1966 Dubberke
3,331,585 A 7/1967 Dubberke
3,365,762 A 1/1968 Spiri
3,432,159 A * 3/1969 Rakatansky .................... 269/20
3,561,811 A 2/1971 Turner, Jr.
3,675,303 A * 7/1972 McKinnon ...................... 29/237
3,702,640 A 11/1972 Cintrack et al.
3,806,021 A 4/1974 Moroz et al.
3,848,850 A 11/1974 Bemis
3,883,009 A 5/1975 Swoboda et al.
3,986,619 A 10/1976 Woolslayer et al.
4,030,698 A 6/1977 Hansen
4,221,269 A 9/1980 Hudson
4,269,554 A 5/1981 Jackson
4,276,918 A 7/1981 Sigouin
4,290,495 A 9/1981 Elliston
4,303,270 A 12/1981 Adair
4,403,666 A 9/1983 Willis
4,403,897 A 9/1983 Willis
4,440,536 A 4/1984 Scaggs
4,547,110 A 10/1985 Davidson et al.
4,595,066 A 6/1986 Nelmark et al.
4,650,237 A 3/1987 Lessway
4,765,225 A 8/1988 Birchard
4,834,604 A 5/1989 Brittain et al.
4,869,137 A 9/1989 Slator
5,150,642 A * 9/1992 Moody et al. .................. 81/57.2
5,458,454 A 10/1995 Sorokan
5,595,248 A 1/1997 Denny
5,609,226 A 3/1997 Penisson
5,649,745 A 7/1997 Anderson
5,660,087 A 8/1997 Rae
5,848,647 A 12/1998 Webre et al.
5,931,238 A 8/1999 Gilmore et al.
5,992,801 A 11/1999 Torres
5,993,140 A 11/1999 Crippa
6,047,771 A 4/2000 Roynestad
6,220,807 B1 4/2001 Sorokan
6,227,587 B1 5/2001 Terral
6,253,845 B1 7/2001 Belik
6,263,763 B1 7/2001 Feigel, Jr. et al.
6,279,662 B1 8/2001 Sonnier
6,311,788 B1 11/2001 Weixler
6,471,439 B2 10/2002 Allamon et al.
6,543,551 B1 4/2003 Sparks et al.
6,543,555 B2 4/2003 Casagrande
6,550,128 B1 4/2003 Lorenz
6,557,641 B2 5/2003 Sipos et al.
6,581,698 B1 6/2003 Dirks
6,745,646 B1 6/2004 Pietras et al.
6,748,823 B2 6/2004 Pietras
6,763,898 B1 7/2004 Roodenburg et al.
6,814,149 B2 11/2004 Liess et al.
6,845,814 B2 1/2005 Masson et al.
7,017,450 B2 3/2006 Bangert
7,028,585 B2 4/2006 Pietras et al.
7,036,202 B2 5/2006 Lorenz
7,055,594 B1 6/2006 Springett et al.
7,090,035 B2 8/2006 Lesko
7,090,254 B1 8/2006 Pietras et al.
7,117,938 B2 10/2006 Hamilton et al.
7,121,166 B2 * 10/2006 Drzewiecki .................. 81/57.33
7,249,639 B2 7/2007 Belik
7,296,623 B2 11/2007 Koithan et al.
7,398,833 B2 7/2008 Ramey et al.
7,438,127 B2 10/2008 Lesko
7,503,394 B2 3/2009 Bouligny
7,726,929 B1 6/2010 Orgeron
7,946,795 B2 5/2011 Orgeron
8,011,426 B1 9/2011 Orgeron
8,235,104 B1 8/2012 Sigmar et al.
2002/0079105 A1 6/2002 Bergeron
2003/0221871 A1 12/2003 Hamilton et al.
2005/0269133 A1 12/2005 Little
2006/0027793 A1 2/2006 Kysely
2006/0278400 A1 12/2006 Bouligny
2008/0078965 A1 4/2008 Lane et al.
2008/0174131 A1 7/2008 Bouligny et al.
2008/0202812 A1 8/2008 Childers et al.
2008/0253866 A1 10/2008 Lops et al.
2011/0200412 A1 8/2011 Orgeron

OTHER PUBLICATIONS

U.S. Appl. No. 12/111,907, filed Apr. 29, 2008; non-published; titled "Pipe Gripping Apparatus" and having common inventors with the present patent application.
U.S. Appl. No. 12/371,590, filed Feb. 14, 2009; non-published; titled "Method of Gripping a Tubular With a Tubular Gripping Mechanism" and having common inventors with the present patent application.
U.S. Appl. No. 12/371,591, filed Feb. 14, 2009; non-published; titled "Method of Gripping a Tubular With a Tubular Gripping Mechanism" and having common inventors with the present patent application.
U.S. Appl. No. 11/923,451, filed Oct. 24, 2007, Keith Orgeron.
U.S. Appl. No. 12/013,979, filed Jan. 14, 2008, Keith Orgeron.
Chronis, Nicholas P.; Mechanisms & Mechanical Devices Sourcebook, 1991, Ch. 10, pp. 399-414, ISBN 0-07-010918-4, McGraw-Hill, Inc.

* cited by examiner

PIPE GRIPPING APPARATUS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a pipe gripping apparatus. More particularly, the present invention relates to a pipe gripping apparatus that can be used to grip different diameters of pipe. More particularly, the present invention relates to a pipe gripping apparatus whereby the pipe is properly centered regardless of the diameter of the pipe.

2. Description of Related Art Including Information Disclosed Under 37 CFR 1.97 and 37 CFR 1.98

In well drilling and well completion operations, it is necessary to lift and properly align lengths of downhole tubulars. For example, in oil or water well drilling, multiple lengths of drill pipe must often be raised from a horizontal position at or near ground level to a vertical position aligned with the centerline of the well. Such lifting and aligning operations require clamps for securely holding the pipe in place as it is lifted. When a pivotally mounted pipe boom is used, this boom must support large loads in several different orientations.

Compounding this problem is the fact that each joint of a length of a downhole tubular must be closely aligned with a string of such tubulars after it has been lifted to the vertical position, such as when a drill pipe or casing is made up. A clamp, or gripper, for this purpose should preferably provide a necessary alignment for downhole tubulars having various diameters, without any adjustment. Proper alignment has been a problem with many such clamps, or grippers, of the prior art, especially those employing pivoted clamping jaws. When pivoted clamping jaws are used, there is a tendency for the center of the downhole tubular to vary as a function of the diameter of the tubular being clamped.

In many circumstances, the pipe can have very rigid side walls. In other circumstances, such as installation of a casing, the side walls of the tubular are relatively thin and flexible. As such, there is a need to develop a pipe gripper assembly whereby the various thicknesses of side walls can be accommodated by the pipe gripping apparatus. It is important that the pipe gripping apparatus not bend, deform, puncture or otherwise dent thin-walled tubulars.

U.S. patent application Ser. No. 11/923,451, filed on Oct. 24, 2007 and Ser. No. 12/013,979, filed on Jan. 14, 2008 by the present inventor, describe pipe handling apparatuses whereby pipe is moved from a horizontal position to a vertical position with a single degree of freedom. In particular, these devices include grippers that grasp the pipe when it is in a horizontal position, move the pipe through the interior of a frame through the use of a particular pipe handling structure, and then position the pipe directly over the well center. Through the use of this device, pipe is accurately moved without the need for adjustment actuators or other mechanisms in order to provide the proper end location for the pipe. Unfortunately, with this device, the grippers associated with the device must be changed, as necessary, so as to accommodate the particular diameter of the pipe being used. The formation of such separate grippers is somewhat difficult because the grippers must be able to properly center the pipe. As such, a need has developed to provide a pipe gripper assembly whereby various diameters of pipe can be accommodated with a single gripper assembly and whereby the pipes that are accommodated by this gripper assembly are properly centered therein.

In the past, various patents have issued relating to a pipe gripping apparatus. U.S. Pat. No. 3,280,920 issued on Oct. 25, 1966 to P. Scott, teaches a portable apparatus for drilling downhole wells. This apparatus has a mast having an open side and a means for supporting a string of drill pipes rotated within the mast. A means for raising and lowering a string of drill pipes in a rectilinear direction parallel to the longitudinal centerline of the mast is provided. This apparatus includes a hydraulic cylinder connected through a suitable arrangement of lines and sheaves so as to apply positive force upon the power swivel so as to move the swivel upwardly or downwardly in the mast as desired. This swivel is mounted on a wheeled carriage which runs on suitable tracks carried by the mast. An elongate frame is pivotably attached to the lower end of the mast for swinging movement to an open side of the mast between a substantially horizontal position and an upright position. Releasable clamps are adapted to grip a section of drill pipe mounted on the frame for a limited longitudinal reciprocating motion thereon.

U.S. Pat. No. 3,365,762, issued on Jan. 30, 1968 to W. H. Spiri, shows a well pipe gripping structure having a slip body having a pipe gripping insert which is slidably movable horizontally into an arcuate guideway in the slip body. The slip body is retained within the guideway by upper and lower lips on the body. The lips have asymmetric retaining surfaces. The inserts are provided with teeth which advance vertically as the teeth advance circularly. The teeth of one insert are positioned out of alignment with the teeth of the other insert to increase the resistance to rotation of the pipe within the slip structure.

U.S. Pat. No. 3,561,811, issued on Feb. 9, 1971 to J. W. Turner, Jr., teaches a well drilling rig having a pipe racker apparatus in which a number of racker arms are controllable from a remote location to engage drill pipe tool joints and drill collars. One of the arms has a head for supporting the weight of lengths of pipe or drill collars being added to or removed from the drill string.

U.S. Pat. No. 3,702,640, issued on Nov. 14, 1972 to Cintract et al., shows a tipping girder with a transfer of tubular elements. This tipping girder has a plurality of adjustable guide nippers movably positioned on the girder for movement transverse to the longitudinal axis thereof. There are adjustable locking nippers movably mounted on the girder for movement parallel to and transverse to the longitudinal axis thereof. The locking nippers are constructed to automatically engage and lock a rod on the girder when it is moved away from the horizontal position.

U.S. Pat. No. 3,806,021, issued on Apr. 23, 1974 to Moroz et al., shows a pipe centering apparatus. This apparatus has a carriage with a column mounted thereon to support a pipe end jointing mechanism. The carriage has a receptacle together with the column. The column pivotally supports a cantilever member of which the free extremity pivotably supports the pipe end jointing mechanism including coaxially arranged grippers adapted to retain the ends of the pipe.

U.S. Pat. No. 4,303,270, issued on Dec. 1, 1981 to H. L. Adair, shows a self-centering clamp for down-hole tubulars. This clamp includes first and second opposed clamping members guided along a clamping axis by first and second guide channels defined by a frame. Each clamping member defines a hydraulic cylinder in which is disposed a piston which is rigidly mounted to the frame. A rack is coupled to move with each of the clamping members. These racks are interconnected via a pinion gear which meshes with both racks so that the two clamping members move in a counter-directional manner and remain equidistant from a central point on the clamping axis.

U.S. Pat. No. 4,403,897, issued on Sep. 13, 1983 to Willis, provides a self-centering clamp for drilling tubulars. This self-centering clamp includes first and second transverse guide rods. Two opposed clamping jaws are guided along the first guide rod. These jaws are positioned by two opposed rocker arms, each of which is mounted to a cross brace which slides along the second guide rod. The rocker arms are symmetrically positioned by a link mechanism which also slides along the second guide rod and by a hydraulic cylinder coupled between the two rocker arms. The frame is pivotably mounted to a pipe boom so as to rotate about an axis parallel to the clamped pipe and transverse to the first and second guide rods.

U.S. Pat. No. 4,650,237 issued on Mar. 17, 1987 to R. J. Lessway, provides an automatic centering and gripping apparatus which includes a housing in which is slidably mounted on a longitudinal movable operator body. A pair of gripper arms is slidably mounted on the operator body. Each gripper arm carries a gripper member engageable with a workpiece. The gripper members are moved longitudinally and laterally into gripping engagement with a workpiece when the operator body is moved in one longitudinal direction. They are correspondingly disengaged from the workpiece when the operator body is moved in the other longitudinal direction.

U.S. Pat. No. 5,609,226 issued on Mar. 11, 1997 to D. J. Penisson, teaches a slip-type gripping assembly having an outer body defining a longitudinal through opening for receipt of the object. A number of slip bodies are circumferentially spaced about the through opening and are radially movable toward and away from the locus of the object. Each slip body is pivotable about a generally longitudinal axis and generally circumferentially centered with respect to the slip body as well as about a tangential axis. A respective force transfer formation is cooperative between each slip body and the outer body for transferring radial force therebetween while permitting the pivoting.

U.S. Pat. No. 5,848,647, issued on Dec. 15, 1998 to Webre et al., shows a pipe gripping apparatus for angularly adapting two misaligned pipes on one or more pipe strings. The apparatus has a housing having internal, opposing downwardly-curved surfaces therein and forming a longitudinal opening for passing a portion of at least one tubing string therethrough. A plurality of slip carriers each has an exterior surface contoured to match the downwardly curved surface and has a downwardly inclined interior surface. Each slip carrier is in movable connection with one of the curved surfaces of the housing. A plurality of slips has downwardly inclined exterior surfaces and longitudinal channels formed on an internal surface for holding gripping elements for gripping a portion of the pipe.

U.S. Pat. No. 5,992,801, issued on Nov. 30, 1999 to C. A. Torres, discloses a pipe gripping assembly and method. This pipe gripping assembly has primary pipe gripping mechanism and a backup and a secondary pipe gripping mechanism carried in a single tapered slip bowl. The primary gripping mechanism employs smooth surface pipe dies that set against and grip and hold the pipe without damaging the pipe surface. After the primary mechanism is set, toothed dies in the secondary gripping mechanism are automatically engaged with the pipe with only a minimal pipe gripping force. Additional slippage of the pipe through the smooth dies sets the toothed dies down against a wedging surface to grip and hold the pipe to stop its downward movement. A resilient biasing device is used to urge the toothed dies away from the pipe before the smooth dies are set.

U.S. Pat. No. 5,993,140, issued on Nov. 30, 1999 to A. Crippa, shows an apparatus for loading pipes onto processing machines. This apparatus has a handler arm with a first segment and a second segment disposed in succession. Kinematic members are adapted to determine a fixed ratio between the rotation angles of the segments about the respective hinging axes.

U.S. Pat. No. 6,543,551, issued Apr. 8, 2003 to Sparks et al., discloses an automatic pipe handling device which includes a support frame mounted on a boring device. Removable pipe racks can be placed in position on the support frame to deliver pipe to the spindle axis or to remove pipe therefrom as required. The pipe sections are removed from the pipe rack and positioned on the spindle axis by pipe grippers mounted on hydraulic cylinders mounted on a rotating longitudinal shaft. The grippers and shaft simultaneously return the used pipe sections for storage to the pipe rack.

U.S. Pat. No. 6,543,555, issued on Apr. 8, 2003 to M. Casagrande, provides an automatic loader for drill rods adapted to be used in association with a boring machine. The automatic motor has a store containing a plurality of drill rods and a movement assembly that is able to selectively remove, one at a time, the drill rods from the store to position them on the guide and drive assembly. The movement assembly is arranged in an intermediate position between the store and the guide and drive assembly so as to not interfere with the latter during the removal of the drill rods from the store.

U.S. Pat. No. 6,845,814, issued on Jan. 25, 2005 to Mason et al., teaches a pipe-gripping structure having load rings. In particular, a rotary slip supports a drill string having a plurality of slip segments connected to define an opening for insertion of the drill string. Each slip segment has a head region, a toe region, and an inner radial surface axially extending between the head and toe regions. The inner radial surface of each slip segment comprises a circumferential groove. A plurality of axially aligned drill string gripping inserts is attached to each slip segment between the head region and the circumferential groove. Each insert has a gripping surface for contacting the drill string.

U.S. Pat. No. 7,055,594, issued on Jun. 6, 2006 to Springett et al., describes a pipe gripper and top drive system in which the pipe gripping system is located beneath the top drive unit. The pipe gripping system has an open throat for receiving a tubular to be gripped by the pipe gripping system. The gripping system has a body with first and second jaws movably connected thereto and a piston/cylinder assembly movably interconnected with each jaw for moving the jaws to clamp and then to rotate the pipe.

U.S. Pat. No. 7,090,035, issued on Aug. 15, 2006 to G. Lesko, describes a method and system for connecting pipe to a top drive motor. This system includes a top drive motor that tilts about a horizontal axis and a pipe launcher that brings joints of pipe up to the drilling platform for connection with a top drive motor at a safe and convenient height above the platform. The top drive motor further includes a clamping assembly that grasps and pulls the joint of the pipe to the motor as the connection is being made. The clamp assembly supports the motor-pipe connection as the top-drive motor is raised in the drilling mast of the rig bringing the joint of pipe up into a vertical orientation for connection with the drill tubing string.

U.S. Pat. No. 7,121,166 B2, issued on Oct. 17, 2006 to Drzewiecki, discloses a tong assembly that has a body and a center member slidable relative to the body. A pair of clamping arms is rotatably connected to the body. The clamping arms are connected to the center member such that as the center member slides relative to the body, the clamping arms rotate relative to the body. The assembly also comprises a plurality of die assemblies, wherein at least one die assembly is mounted to each clamping arm and at least one die assembly is mounted to the center member.

It is an object of the present invention to provide a pipe gripper apparatus whereby different diameters of pipe can be gripped by the same mechanism.

It is another object of the present invention to provide a pipe gripping apparatus which self-centers the pipes that are gripped regardless of the diameter of the pipe.

It is still another object of the present invention to provide a pipe gripping apparatus that can be used in conjunction with a pipe handling device.

It is another object of the present invention to provide an apparatus to grip and to center any shape having three surfaces with the same radius to the center of the shape.

It is another object of the present invention to provide a gripping apparatus with zero centering error for any two tubular reference diameters and nearly zero error for any tubular diameter between the reference diameters and just less than the smaller reference diameter and just more than the larger reference diameter.

It is another object of the present invention to provide a gripping apparatus for a broad range of tubular diameters, where the largest diameter would be several times the value of the smallest diameter, and wherein this range of tubular diameters would have exactly zero centering error for at least two specific sizes of tubulars.

It is another object of the present invention to provide an apparatus that is unlimited in the geometry relative to the radii shown below, $R1 \neq R2$, in order to allow any number of customized variations of tubular diameter ranges to be accommodated and have jaws appropriately sized to provide the best mechanical advantage for the space available.

It is still another object of the present invention to provide an apparatus that can be used to hold pipe with grippers, to torque pipe with toothed dies, and to spin pipe with rollers.

These and other objects and advantages of the present invention will become apparent from a reading of the attached specification and appended claims.

BRIEF SUMMARY OF THE INVENTION

The present invention is a pipe gripping apparatus comprising a first jaw having a pipe- contacting surface at one end thereof, a second jaw having a pipe-contacting surface at one end thereof, a tongue having a pipe-contacting surface at one end thereof, and an actuator. The tongue is connected to the first and second jaws. The actuator is connected to the tongue so as to move the first and second jaws and the tongue such that the pipe-contacting surfaces thereof move radially inwardly for a substantially identical distance.

The first jaw has a first pivot point adjacent the tongue. The second jaw has a first pivot point adjacent the tongue. The actuator has a piston connected to the tongue so as to move the tongue, a cylinder connected to the piston, and a fluid line connected to the cylinder. The pipe gripping apparatus further comprises a top plate connected to the pivot points of the first jaw and the second jaw and a bottom plate connected to the pivot points of the first jaw and the second jaw.

The tongue is connected by a first link to the first jaw. The first link is pivotally connected at a second pivot point to the first jaw. The first link is pivotally connected to the tongue at an end opposite the first jaw. The first link angles outwardly with respect to the tongue. The tongue is connected by a second link to the second jaw. The second link is pivotally connected at a second pivot point to the second jaw. The second link is pivotally connected to the tongue at an end opposite the second jaw. The second link angles outwardly with respect to the tongue.

The first jaw has a first distance between the pipe-contacting surface of the first jaw and the first pivot point of the first jaw. The first jaw has a second distance between the first pivot point of the first jaw and the second pivot point of the first jaw. The second jaw has a first distance between the pipe-contacting surface of the second jaw and the first pivot point of the second jaw. The second jaw has a second distance between the first pivot point of the second jaw and the second pivot point of the second jaw. The first and second distances of the first jaw are unequal. The first and second distances of the second jaw are unequal.

The pipe-contacting surfaces of the first and second jaws and the tongue can be an elastomeric pad. The pipe-contacting surfaces of the first and second jaws and the tongue can be a toothed die. The pipe-contacting surfaces of the first and second jaws and the tongue can be a roller.

The present invention contemplates the gripping of any shape having a first region, a second region, and a third region, the regions having substantially identical radial distance to a center of the shape.

DETAILED DESCRIPTION OF THE INVENTION

Figure 1:
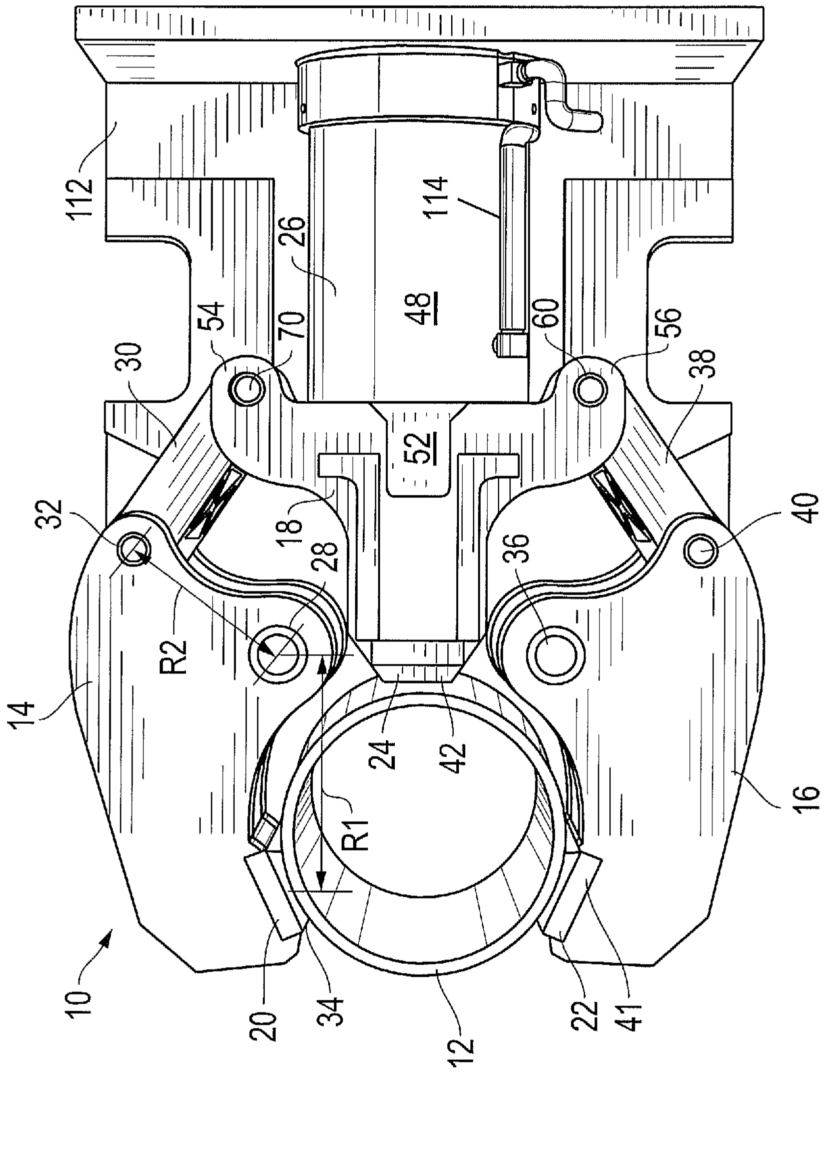
FIG. 1 is a perspective top view of the pipe gripping apparatus of the present invention as used in accordance with a large diameter pipe.

Referring to FIG. 1, there is shown a perspective top view of the pipe gripping apparatus 10 of the present invention as used with a large diameter pipe 12. As can be seen in FIG. 1, the pipe gripping apparatus 10 includes a first jaw 14, a second jaw 16 and a tongue 18. The first jaw 14 includes a pipe-contacting surface 20 at one end thereof. The second jaw 16 includes a pipe-contacting surface 22 at one end thereof. The tongue 18 also has a pipe contacting surface 24 at one end thereof. An actuator 26 is connected to the tongue 18 so as to move the pipe-contacting surfaces 20, 22 and 24 radially inwardly and simultaneously for a substantially identical distance.

The first jaw 14 has a unique configuration. In particular, the first jaw 14 has a first pivot point 28 positioned adjacent to the tongue 18. The first jaw has a second pivot point 32. A first link 30 is connected to second pivot point 32 in spaced relationship with first pivot point 28 on a side of the first jaw 14 opposite the tongue 18. An elastomeric pad 34 is the contacting surface 20 of the first jaw 14. As such, the pipe-contacting surface 20 is slightly flexible so as to avoid any damage to the outer surface of the pipe 12. The contacting surface 20 of the first jaw 14 can also be a toothed die of a tong or a roller of a spinner.

The second jaw 16 has a configuration similar to the first jaw 14. In particular, first pivot point 36 is positioned in proximity to the tongue 18. The second jaw has a second pivot point 40. A link 38 is pivotally connected at second pivot point 40 to the second jaw 16. The second pivot point 40 is located on a side of the second jaw 16 opposite the tongue 18. The links 30 and 38 assure that there is a proper movement of the jaws 14 and 16 radially inwardly relative to the movement of the tongue 18. The links 30 and 38 are anchored to a top cover plate (not shown) located above the apparatus 10 and to a bottom cover plate 112 located below the apparatus. An elastomeric pad 41 is the contacting surface 22 of the second jaw 16. The contacting surface 22 of the second jaw 16 can also be a toothed die of a tong or a roller of a spinner.

The tongue 18 is generally an elongated longitudinal member extending toward the pipe 12 and between the first jaw 14 and second jaw 16. The tongue 18 has outwardly extending surfaces 54 and 56. Surface 54 is pivotally connected to the first link 30. Surface 56 is pivotally connected to the second link 38. The tongue 18 is connected to a piston 52 at an end of the tongue 18 opposite the pipe-contacting surface 24. An elastomeric pad 42 is located on the end of the tongue 18 as the pipe-contacting surface 24. The contacting surface 24 of the tongue 18 can also be a toothed die of a tong or a roller of a spinner.

The link 30 has a pivot point 70 at an end opposite pivot point 32 pivotally connected to the surface 54. Similarly, the link 38 has a pivot point 60 at an end opposite pivot point 40 that is connected to the surface 56. As the tongue 18 moves toward the pipe 12, the links 30 and 38 move angularly outwardly from the tongue 18 so as to cause the respective jaws 14 and 16 to rotate the pipe-contacting surfaces 20 and 22 inwardly toward the outer surface of pipe 12. If the diameter of pipe 12 is smaller, then the tongue 18 will move further toward the pipe 12 so as to cause the links 30 and 38 to move further angularly outwardly and thus to cause the jaws 14 and 16 to rotate further inwardly.

The actuator 26 is a piston-and-cylinder assembly that includes a piston 52, a cylinder 48, and a fluid line 114. Thus, the piston-and-cylinder assembly is a conventional hydraulic actuator. The piston 52 is connected to the tonguel8 so as to move the tongue 18 in a direction toward the pipe 12 or in a direction away from the pipe 12. It can be seen that a fluid line 114 is connected to the cylinder 48 so as to deliver hydraulic fluid for the actuation of piston 52, and thus the tongue 18, toward and away from the pipe 12.

As can be seen in FIG. 1, when the jaws 14 and 16, along with the tongue 18, move toward the pipe 12, each of the pipe-contacting surfaces 20, 22 and 24 will contact the outer surface of the pipe 12 simultaneously. As such, the actuator 26 provides for the coordinated movement of the jaws 14 and 16 and the tongue 18. Each of the pipe-contacting surfaces 20, 22 and 24 moves radially inwardly simultaneously for a substantially identical distance. As will be described hereinafter, if the pipe 12 is of a smaller diameter, the pipe contacting surfaces 20, 22 and 24 will move further radially inwardly in a coordinated movement.

Figure 2:
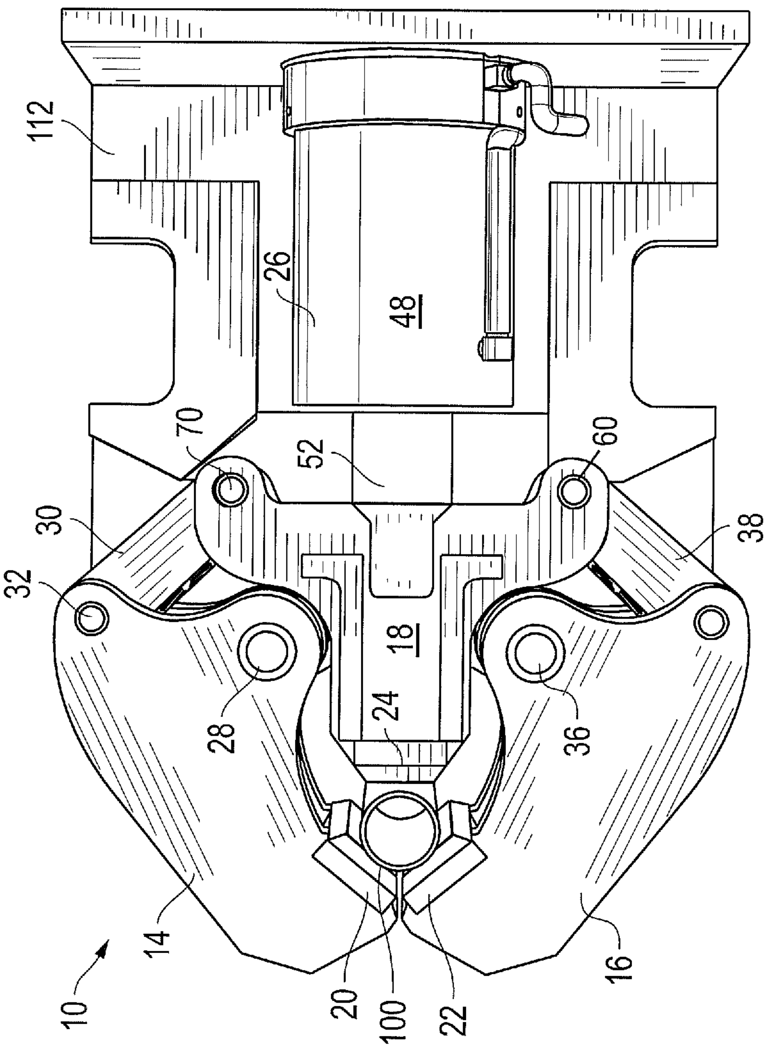
FIG. 2 is a perspective top view of the pipe gripping apparatus of the present invention as used in association with a small diameter pipe.

FIG. 2 illustrates a perspective top view of the pipe gripping apparatus 10 of the present invention as utilized in association with a small diameter pipe 100. As can be seen, the pipe contacting surfaces 20, 22 and 24 of the respective jaws 14 and 16 and the tongue 18 extend inwardly for a greater radial distance than illustrated in FIG. 1. As such, the smaller diameter pipe 100 is positioned between these pipe-contacting surfaces 20, 22 and 24 and centrally located within the pipe gripping apparatus 10. In the present invention, as can be seen in FIGS. 1 and 2, the central axes of the pipe 12 and the pipe 100 align with each other. As such, the pipe gripping apparatus 10 of the present invention can be utilized with different diameters of pipe while, at the same time, assuring that the pipe is properly centered within the apparatus 10.

In particular, in FIG. 2, it can be seen that the piston 52 of the piston-and-cylinder assembly is urged outward of the cylinder 48 in the direction of the pipe 100. This causes the tongue 18 to be urged further in the direction of the pipe 100. This movement causes the respective links 30 and 38 to move angularly outwardly from the position illustrated in FIG. 1. This angular outward movement rotates the respective jaws 14 and 16 about the first pivot points 28 and 36. As such, while the tongue 18 is moving radially toward the pipe 100, the pipe-contacting surfaces 20 and 22 of respective jaws 14 and 16 are simultaneously moved an substantially identical radial distance toward the pipe 100.

When it is desired to release either the pipe 12 or the pipe 100, it is only necessary for the piston 52 of actuator 26 to move rearwardly. This serves to cause the pipe-contacting surfaces 20, 22 and 24 to move away from the outer surface of the respective pipes 12 or 100 so as to properly release the pipes 12 and 100 in a desired location. Further movement of the pipe contacting surface 24 of actuator 26 rearwardly will cause the jaws 14 and 16, along with the tongue 18, to move the pipe-contacting surfaces 20, 22 and 24 further away from each other so that this opening will allow the introduction of another pipe.

Referring again to FIG. 1, a novel aspect of the present invention is that a variety of pipe diameters can be utilized without the need to change the jaws 14 and 16 of the gripping apparatus 100. The present invention automatically grips different diameters of pipe while, at the same time, assuring a centering of such pipes with minimal error. The jaws 14 and 16 have two important measurements, R1 and R2. R1 is the distance between the first pivot point 28 and 36 and the pipe-contacting surfaces 20 and 22 of the first and second jaws 14 and 16, respectively. R2 is the distance between the first pivot points 28 and 36 and the second pivot points 32 and 40 of the first and second jaws 14 and 16, respectively.

In the present invention, distance R1 is not equal to R2. Prior art is limited in that it requires R1 to equal R2. For example, the prior art gripping apparatus of U.S. Pat. No. 7,121,166 B2 has R1 equal to R2. Having R1 not equal to R2 in the present invention allows the present invention to grip different diameters of pipe while simultaneously centering with minimal error. Any number of customized variations of tubular diameter ranges can be accommodated by geometrically solving for the optimum size of links 30 and 38 and appropriately sizing the distances R1 and R2 of the jaws 14 and 16 so as to provide the best mechanical advantage for the space available. Sizing the apparatus 10 of the present invention in this manner allows the apparatus 10 to grip with zero centering error for any two tubular reference diameters and nearly zero error for any tubular diameter between the reference diameters and just less than the smaller reference diameter and just more than the larger reference diameter. The prior art gripping apparatus of U.S. Pat. No. 7,121,166 B2 has zero error at only one pipe diameter, whereas the apparatus 10 of the present invention achieves zero centering error for any two tubular diameters. The present invention contemplates that any range of diameters would have a large diameter that is several times the value of the small diameter, and wherein this range of tubular diameters would have exactly zero centering error for at least two specific sizes of pipe. The present invention also is unlimited in the geometry relative to the distances R1 and R2. That is, R1 and R2 can be any values where R1 is not equal to R2.

Another important and novel feature of the present invention is the orientation of the links 30 and 38. First link 30 is pivotally connected to the tongue 18 at pivot point 70. Link 30 angles outwardly to second pivot point 32, where the first link 30 is pivotally connected to the first jaw 14. Likewise, the second link 38 is pivotally connected to the tongue 18 at pivot point 70 and angles outwardly to second pivot point 40, where the second link 38 is pivotally connected to the second jaw 16. The outward angle of links 30 and 38 uses less space than prior art gripping apparatuses that have links extending parallel to the length of the gripper. Thus, the apparatus 10 of the present invention can be used in smaller spaces than prior art gripping apparatus. The links 30 and 38 move both laterally and longitudinally, as opposed to only longitudinally.

Figure 3:
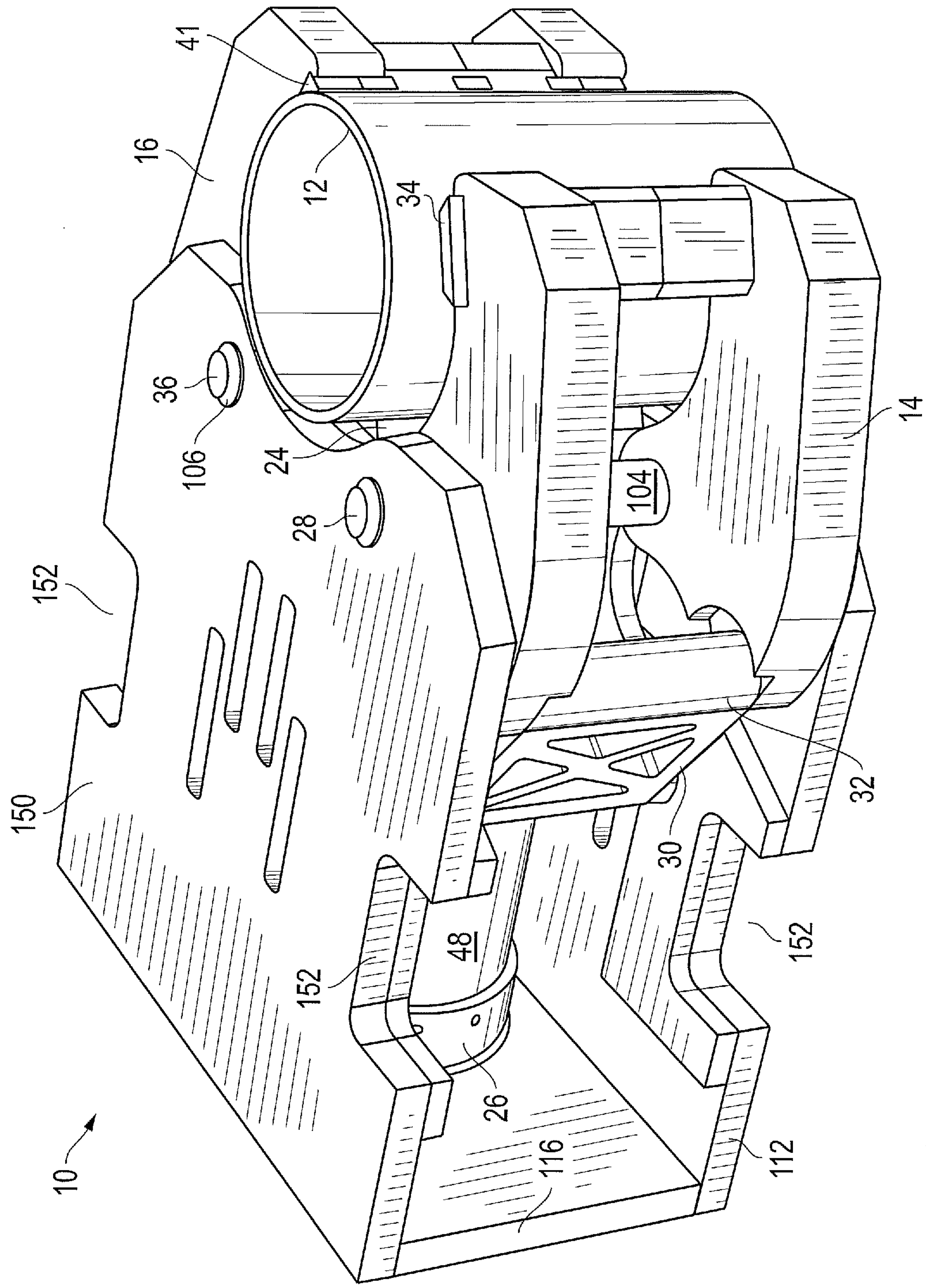
FIG. 3 is an upper perspective view of the pipe gripping apparatus of the present invention.

FIG. 3 illustrates a perspective side view of the pipe gripping apparatus 10 of the present invention with a top cover plate 150 and a bottom cover plate 112 mounted thereon. In FIG. 3, it can be seen that the jaws 14 and 16 have elastomeric pads 34 and 41 thereon. A large diameter pipe 12 is illustrated as received between the pipe-contacting surfaces of the jaws 14 and 16. A rod 104 defines the first pivot point 28 associated with the first jaw 14. Similarly, a rod 106 defines the first pivot point 36 of the second jaw 16. The first link 30 is connected to the second pivot point 32 of the first jaw 14 and extends toward the tongue 18. The tongue (not shown) extends so as to have a pipe-contacting surface 24 surface contacting the outer surface of pipe 12. An end plate 116 is affixed to the cover plate 112 and cover plate 150. The end plate 116 is connected to the piston-and-cylinder assembly of the actuator 26. As such, structural support for the piston-and-cylinder assembly is properly provided.

The pipe gripping apparatus 10 of the present invention will typically be used in conjunction with a pipe handling apparatus, such as that described in U.S. patent application Ser. No. 11/923,451, filed on Oct. 24, 2007 and Ser. No. 12/013,979, filed on Jan. 14, 2008 by the present inventor. The pipe gripping apparatus 10 can be mounted to a pipe handling apparatus with rails. Thus, slots 152 are formed in the top cover plate 150 and bottom cover plate 112 so as to accommodate these rails.

Figure 4:
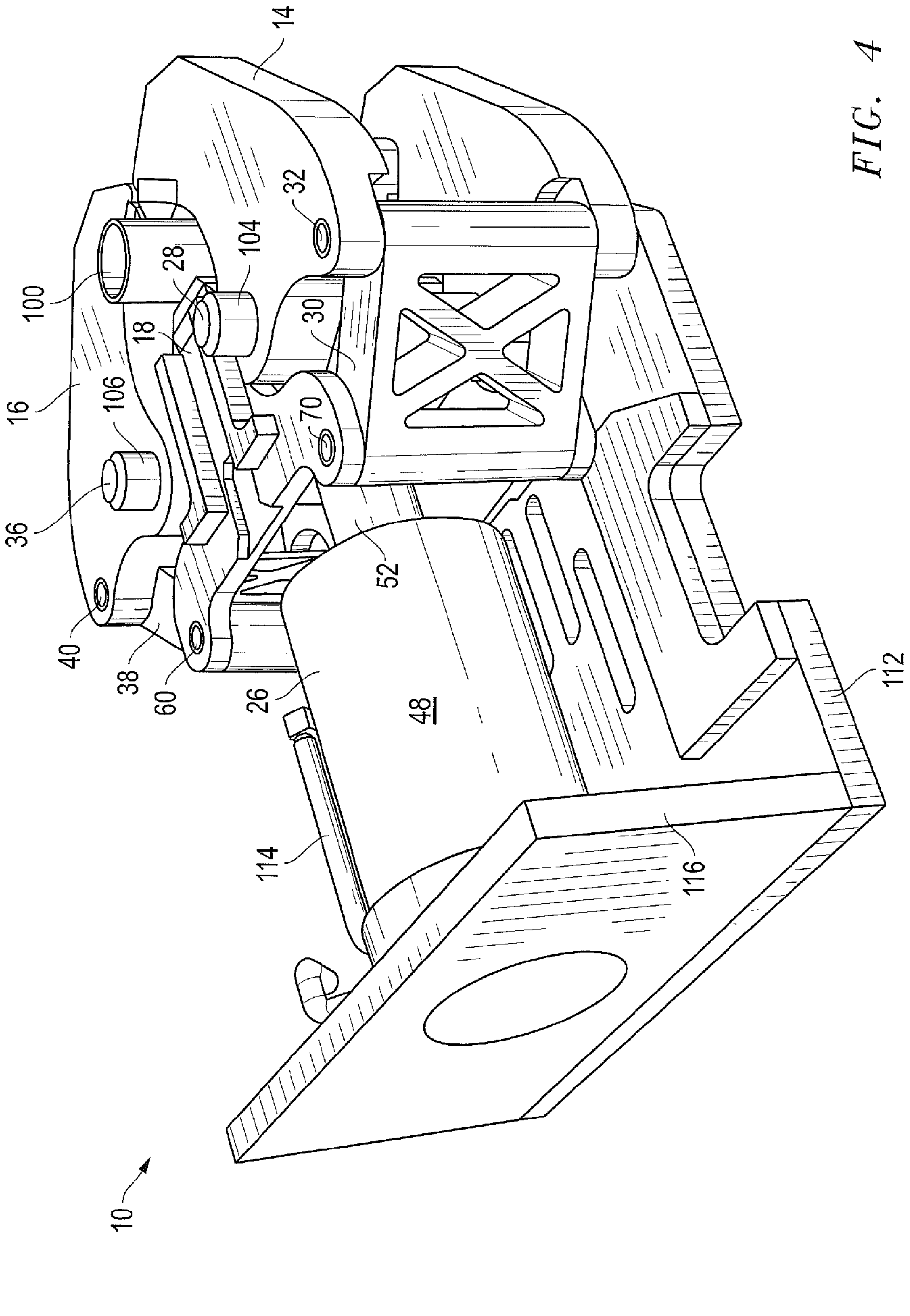
FIG. 4 is a rearward perspective view of the pipe gripping apparatus of the present invention.

FIG. 4 shows a side perspective view from the back of the pipe gripping apparatus 10 of the present invention. It can be seen that the fluid line 114 serves to deliver hydraulic fluid into the interior of the cylinder 48 of the actuator 26. Hydraulic fluid is delivered so as to drive the piston 52 within the interior of the cylinder 48. As the piston 52 moves out of the cylinder 48, the piston 52 drives the tongue 18 outwardly. In particular, in FIG. 4, the tongue 18 extends so as to abut the outer surface of the pipe 100. The links 30 and 38 have holes formed therein so as to provide a more lightweight linkage between the jaws 14 and 16 and the tongue 18 while retaining structural integrity. Rods 104 and 106 of first pivot points 28 and 36, respectively, are attached to the top cover (not shown) and the bottom cover 112. The first and second jaws 14 and 16 are not connected to the cover plates 112 and 150 at any other points. Likewise, the tongue 18 and links 30 and 38 are not connected to the cover plates 112 and 150. Thus, the pivot points 32, 40, 60, and 70 slide along the cover plates 112 and 150 but are not attached thereto.

Figure 5:
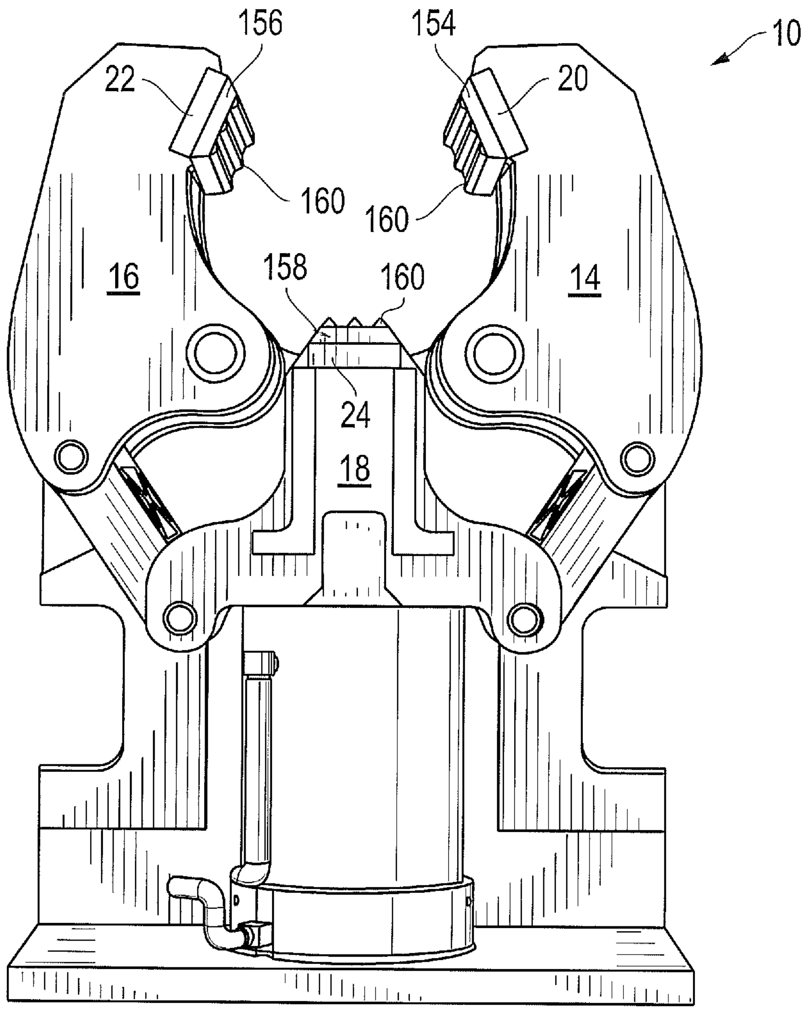
FIG. 5 is a top perspective view of the pipe gripping apparatus of the present invention having toothed dies.

FIG. 5 shows a top perspective view of the apparatus 10 of the present invention with toothed dies 154, 156, and 158 as the pipe-contacting surfaces 20, 22, and 24, respectively. Teeth 160 protrude from each of the toothed dies 154, 156, and 158 so as to grab the outer surface of a pipe. The toothed dies 154, 156, and 158 grab the outer surface of the pipe so as to allow a torque to be applied to the pipe in order to rotate the pipe. Toothed die 154 is associated with the first jaw 14. Toothed die 156 is associated with the second jaw 16. Toothed die 158 is associated with the tongue 18.

Figure 6:
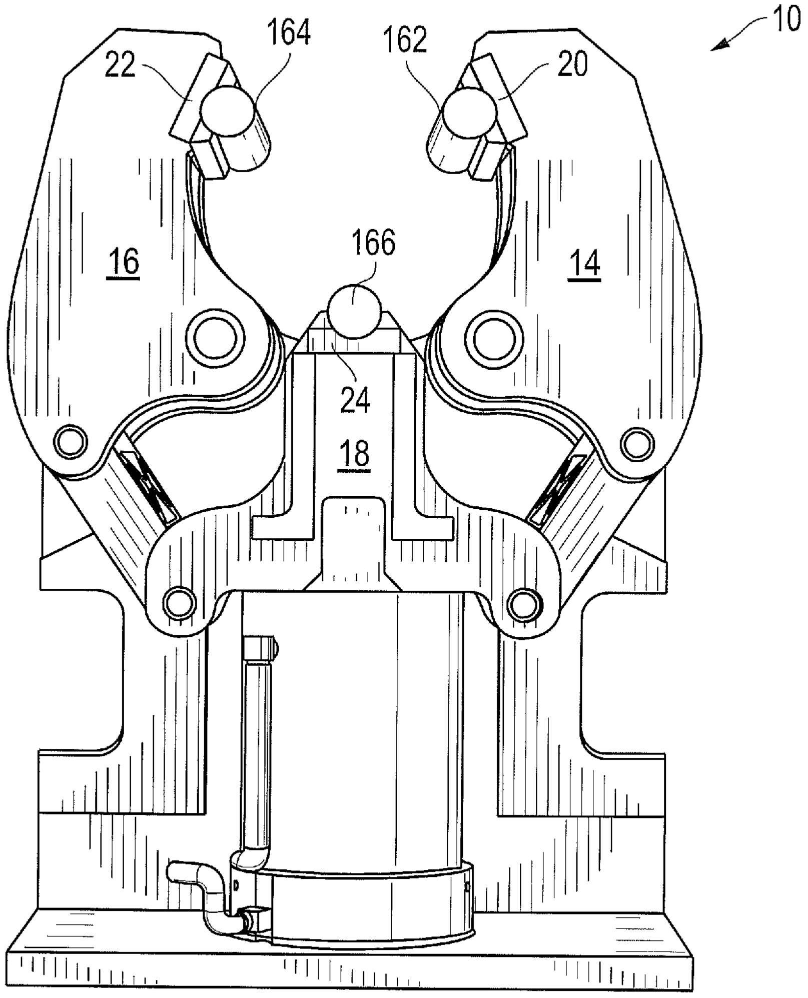
FIG. 6 is a top perspective view of the pipe gripping apparatus of the present invention having rollers.

FIG. 6 shows a top perspective view of the apparatus 10 of the present invention with rollers 162, 164, and 166 as the pipe-contacting surfaces 20, 22, and 24, respectively. The rollers 162, 164, and 166 allow the outer surface of a pipe to spin in an controlled manner while enclosed by the first jaw 14, second jaw 16, and tongue 18. Roller 162 is associated with the first jaw 14. Roller 164 is associated with the second jaw 16. Roller 166 is associated with the tongue 18.

While the pipe gripping apparatus 10 of the present invention has been described above as gripping pipe, the present invention contemplates that the apparatus 10 can be used for gripping any shape that has three regions with substantially identical distances to the center of the shape. For example, the apparatus 10 of the present invention could grip a triangular-shaped object in addition to a tubular object as described above.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A pipe gripping apparatus comprising:

a first jaw having a pipe-contacting surface at one end thereof;

a second jaw having a pipe-contacting surface at one end thereof;

a tongue having a pipe-contacting surface at one end thereof;

a first and second pivot point located on the first jaw;

a first link pivotally connected between the second pivot point on the first jaw and the tongue;

a first and second pivot point located on the second jaw;

a second link pivotally connected between the second pivot point on the second jaw and the tongue;

the first jaw having a first distance between the pipe-contacting surface of the first jaw and the first pivot point of the first jaw and a second distance between the first pivot point of the first jaw and the second pivot point of the first jaw, the first and second distances of the first jaw being unequal;

the second jaw having a first distance between the pipe-contacting surface of the second jaw and the first pivot point of the second jaw and a second distance between the first pivot point of the second jaw and the second pivot point of the second jaw, the first and second distances of the second jaw being unequal; and an actuator connected to the tongue, the actuator for moving the first and second jaws and the tongue such that the pipe-contacting surfaces thereof move radially inwardly for a substantially identical distance.

2. The pipe gripping apparatus of claim 1, the actuator further comprising:

a piston connected to the tongue so as to move the tongue;

a cylinder connected to the piston; and a fluid line connected to the cylinder.

3. The pipe gripping apparatus of claim 1, further comprising:

a top plate connected to the first pivot points of the first jaw and the second jaw; and a bottom plate connected to the first pivot points of the first jaw and the second jaw.

4. The pipe gripping apparatus of claim 1, the first link angling outwardly with respect to the tongue, the second link angling outwardly with respect to the tongue.

5. The pipe gripping apparatus of claim 1, the pipe-contacting surfaces of the first and second jaws and the tongue being an elastomeric pad.

6. The pipe gripping apparatus of claim 1, the pipe-contacting surfaces of the first and second jaws and the tongue being a toothed die.

7. The pipe gripping apparatus of claim 1, the pipe-contacting surfaces of the first and second jaws and the tongue being a roller.

* * * * *